(12) United States Patent
Lerner et al.

(10) Patent No.: US 10,649,536 B2
(45) Date of Patent: May 12, 2020

(54) DETERMINATION OF HAND DIMENSIONS FOR HAND AND GESTURE RECOGNITION WITH A COMPUTING INTERFACE

(71) Applicant: INTEL CORPORATION, Santa Clara, CA (US)

(72) Inventors: Alon Lerner, Holon (IL); Shahar Fleishman, Hod Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/951,370

(22) Filed: Nov. 24, 2015

(65) Prior Publication Data

US 2017/0147075 A1    May 25, 2017

(51) Int. Cl.
 *G06F 3/01* (2006.01)
(52) U.S. Cl.
 CPC ................... *G06F 3/017* (2013.01)
(58) Field of Classification Search
 CPC .... G06F 3/0304; G06F 3/0325; G06F 3/0421; G06F 3/0425; G06F 3/0428; G06F 3/017; G06F 3/0308; G06F 3/048
 USPC ................................................. 345/156–166
 See application file for complete search history.

(56) References Cited

U.S. PATENT DOCUMENTS

| | | | |
|---|---|---|---|
| 9,747,717 B2 * | 8/2017 | Fleishman | G06K 9/00355 |
| 9,870,056 B1 * | 1/2018 | Yao | G06F 3/011 |
| 9,910,498 B2 * | 3/2018 | Kutliroff | G06F 3/017 |
| 9,911,219 B2 * | 3/2018 | Fleishman | G06K 9/00355 |
| 2008/0002860 A1 * | 1/2008 | Super | G06K 9/00375 382/114 |
| 2008/0273755 A1 * | 11/2008 | Hildreth | G06F 1/1626 382/103 |
| 2010/0110003 A1 * | 5/2010 | Chou | G06K 9/00355 345/157 |
| 2011/0175802 A1 * | 7/2011 | Hsieh | G06F 3/017 345/156 |
| 2012/0235903 A1 * | 9/2012 | Im | G06F 3/005 345/158 |

(Continued)

OTHER PUBLICATIONS

Fleishman S et al., "ICPIK: Inverse Kinematics based Articulated-ICP", The IEEE Conference on Computer Vision and Pattern Recognition (CVPR) Workshops, 2015, pp. 28-35.

(Continued)

*Primary Examiner* — Amit Chatly
*Assistant Examiner* — Nelson Lam
(74) *Attorney, Agent, or Firm* — Finch & Maloney PLLC (57) ABSTRACT

Hand dimensions are determined for hand and gesture recognition with a computing interface. An input sequence of frames is received from a camera. Frames of the sequence are identified in which a hand is recognized. Points are identified in the identified frames corresponding to features of the recognized hand. A value is determined for each of a set of different feature lengths of the recognized hand using the identified points for each identified frame. Each different feature length value is collected for the identified frames independently of each other feature length value. Each different feature length value is analyzed to determine an estimate of each different feature length, and the estimated feature lengths are applied to a hand tracking system, the hand tracking system for applying commands to a computer system.

19 Claims, 6 Drawing Sheets

(56) References Cited

U.S. PATENT DOCUMENTS

| | | | | |
|---|---|---|---|---|
| 2013/0335324 A1* | 12/2013 | Kaplan | ............... | G06F 3/011 345/158 |
| 2014/0240213 A1* | 8/2014 | Alaniz | ............... | G06F 3/017 345/156 |
| 2014/0321718 A1* | 10/2014 | Wabgaonkar | ......... | G06T 7/408 382/115 |
| 2015/0015490 A1* | 1/2015 | Ahn | ............... | G06F 3/011 345/166 |
| 2015/0035961 A1* | 2/2015 | Chen | ............... | G06K 9/00067 348/77 |
| 2015/0104075 A1* | 4/2015 | MacDougall | ...... | G06K 9/00355 382/106 |
| 2015/0153833 A1* | 6/2015 | Pinault | ............... | G06F 3/011 345/156 |
| 2015/0161437 A1* | 6/2015 | Mazurenko | ........ | G06K 9/00389 382/103 |
| 2015/0205362 A1* | 7/2015 | Park | ............... | G06F 3/017 345/156 |
| 2016/0170492 A1* | 6/2016 | DeBattista | ............. | G06F 3/017 345/156 |
| 2017/0090677 A1* | 3/2017 | Kaye | ............... | G06F 1/163 |
| 2018/0239439 A1* | 8/2018 | Gribetz | ............... | G06F 3/017 |
| 2018/0275767 A1* | 9/2018 | Hildreth | ............... | G06F 3/017 |

OTHER PUBLICATIONS

Taylor J et al., "User-Specific Hand Modeling from Monocular Depth Sequences", Proceedings of the 2014 IEEE Conference on Computer Vision and Pattern Recognition, 2014, 8 pages.

Oikonomidis, N et al., "Markerless and Efficient 26-DOF Hand Pose Recovery", ACCV, 2011, pp. 2035-2047.

Ganapathi V et al., "Real-Time Human Pose Tracking from Range Data", ECCV, 2012, 14 pages.

Tompson J et al., "Real-Time Continuous Pose Recovery of Human Hands Using Convolutional Networks", ISGGRAPH, 2014, 10 pages.

Melax S et al., "Dynamics Based 3D Skeletal Hand Tracking", arXiv:1705.07640v1, May 22, 2017, 8 pages.

\* cited by examiner

DETERMINATION OF HAND DIMENSIONS FOR HAND AND GESTURE RECOGNITION WITH A COMPUTING INTERFACE

FIELD

The present description relates to determining dimensions for hand and gesture recognition for a computing interface.

BACKGROUND

Many computer input and control systems are being developed which respond to hand motions and gestures. Rather than typing, pressing buttons, or operating a cursor control device, the user makes hand motions in front of a camera. Simpler systems respond only to hand waves and arm motions. For more detailed control, the movements of individual fingers are tracked.

In some systems, a depth-based hand tracking system is used. A camera system with multiple sensors determines, not only the appearance of the hand, but also the distance to different points on the hand. The output of a hand tracking system is a full hand skeleton. The system tracks not only the movements of finger tips, but also the individual finger joints and wrist, the angles between the bones and the global position of the hand in space. Some systems track hand movements in three dimensions by fitting a model of the hand to an input video of the hand from the system camera.

Once the hand motion is determined, then the motion can be interpreted as an input, such as a command, to the computing system. The hand tracking system delivers a command to an input system which then executes the command. Hand tracking can also be used for authentication and other purposes.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

The proposed invention describes a method for measuring the dimensions of a user's hand (individual finger lengths, palm width and palm length). These measurements may be used as an integral part of a hand tracking system based on depth camera technology. Hand tracking may be used for authentication, for user input, for commands, and for gaming and augmented reality applications.

In practice, when a hand gesture recognition system is designed to work with multiple users, then the system uses an estimation of the size and proportions of the hand being recognized. Actual users have hands of different sizes. In addition, the hands of different users have different proportions. Some people have longer or shorter fingers. Some have wider or narrower palms. Even the relative dimensions between different fingers and the thumb will vary between different users. If a system assumes that all hands are the same size or that all hands have the same proportions, then the system may fail to accurately track the hand and to accurately recognize hand gestures.

As described herein the dimensions of a user's hand, e.g. individual finger lengths, the palm width and length, are measured as an integral part of a hand tracking system. The measurements are made using a depth camera. This allows a depth-based hand tracking system to accurately produce a full hand skeleton. Such a skeleton may include fingertip positions, individual finger joints, wrist, the angles between the bones, and the global position of the hand in space.

For a system that interprets hand gestures using a model of the gesturing hand, the dimensions of the hand model may be updated in real-time based on the dimensions of the actual user's gesturing hand. The hand dimensions may be estimated continuously or periodically during use. Estimating the hand dimensions in real time while tracking hand movements allows the system to work as soon as a user puts his hand in the camera's field-of-view.

Instead of using an initialization phase to measure the size of a hand, as described herein, the system may be able to start immediately with a rough estimate of the hand dimensions. The estimate may then be improved as the user continues to use the system. Within a few seconds, the hand dimension estimate has typically reached sufficient accuracy. While the initialization phase provides higher accuracy initially, it delays use of the system. The statistical analysis described herein may be used for an initialization phase or for a system that starts with a rough guess.

The hand dimensions are particularly useful when the distances between tracked features in consecutive frames vary due to tracking inaccuracies, noise, occlusions and so on. A skeleton derived directly from the distances between tracked features has dimensions that vary from frame to frame, causing jitters, incorrect tracking, false gestures, etc. The results are similar to fitting a skeleton of a constant, but inaccurate size, to the tracked features.

As described herein, statistical analysis may be used to approximate the lengths of the five fingers as well as the width and length of the palm of a user's hand. These lengths will be referred to herein as feature lengths. Due to tracking inaccuracies, noise, distortions, occlusions, etc. even for relatively simple hand motions in which all of the features are clearly visible, feature length measurements may be inaccurate in one or more of the frames. In the described examples, the measurements of each feature length in each of a set of different frames are treated as a set of random samples taken from a normal distribution. The results are analyzed statistically to determine an actual length for each feature. In some embodiments, the mean value of the measurements is used as the correct feature length The size of the hand in the field of view of a camera is measured as described herein. This is particularly useful as a part of a hand tracking system that uses depth camera technology, however, the invention is not so limited. The size described herein is the individual finger lengths, the palm width and the palm length. Similar techniques may be applied to measuring other dimensions of a hand as well.

Input Data

Figure 1:
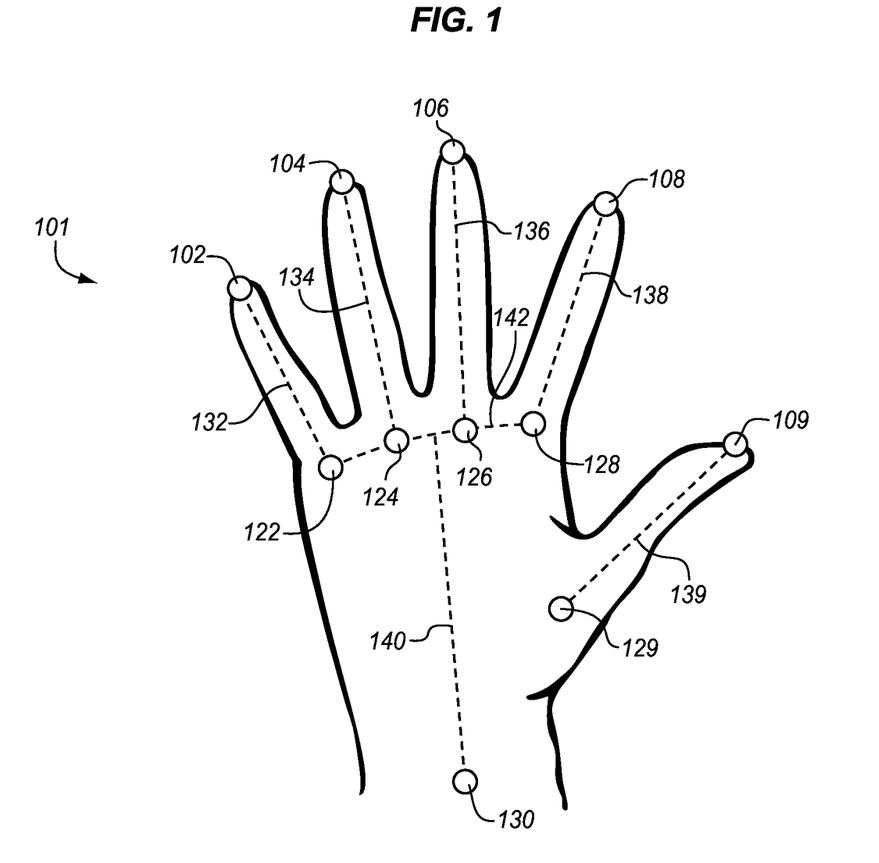
FIG. 1 is a diagram of a recognized hand with feature points and feature lengths identified according to an embodiment.

A depth camera system of a device captures video as a sequence of images. The images are analyzed to determine features. When a hand is presented in front of the camera then a feature recognition system recognizes the features as belonging to a hand. The feature recognition system is then able to provide a set of points in 3D (Three Dimensional) space that correspond to the characteristic positions on the identified hand. The input to determining dimension is the labeled points in 3D space, which represent the position of each one of the finger joints and that of the wrist for the current tracking frame. In some embodiments, this set of features can be simplified to include labeled points only for the finger tips, finger bases and the wrist. These features are shown in FIG. 1 which is a diagram of a hand 101 with the fingers fully extended, rather than bent.

With the fingers straight, the hand has a fingertip for the little finger 102, the ring finger 104, the index finger 106, and the index finger 108. The bases of the fingers are also identified for the little finger 122, ring finger 124, middle finger 126, and index finger 128. The thumb has a tip 109 and a base 129 and the palm has a base 130. The hand may be a right hand or a left hand and the view may be from the front or the back of the hand.

The hand features may be extracted in any a variety of different ways depending on the particular implementation. In some embodiments, fingers are detected by computing a medial axis of the contour of a hand mask. Convexity defects may be used to approximate the finger base positions. A random forest classifier may be used to label the fingers, that is to identify the fingers as index, middle, ring, little or thumb. Alternatively, any of a variety of other classification techniques may be used instead of or in addition to a random forest approach. Some example techniques include a support vector machine (SVM), neural networks (NN), deep neural networks (DNN), and Adaboost. To determine the position of the wrist, direction vectors may be extended from an origin at the finger bases through the middle of the hand. The middle of the hand may be determined by computing a distance transform from the exterior dimensions of the hand.

Measurements

Using base and tip input information, the dimensions of the hand may be determined. Some of the dimensions are indicated by dotted lines in FIG. 1. The length of each finger 132, 134, 136, 138 and the thumb 139 is defined by the distance from the base to the tip of each respective digit.

For the palm, the dimensions may be determined in a variety of different ways to suit the gesture recognition system. In some embodiments, the width of the palm is taken as 4/3 of the distance between the base of the little finger and the base of the index finger. This indirect determination takes advantage of the identified features and uses as an approximation that the distance between the little finger and index finger bases is about three fingers wide. The palm is then assumed to be four fingers wide. Other approximations or direct measurements may be used. In some embodiments, the length of the palm may be defined as the distance 140 between the wrist 130 and a line 142 connecting the base of the pinky and index fingers.

Feature Length Estimation

Figure 2:
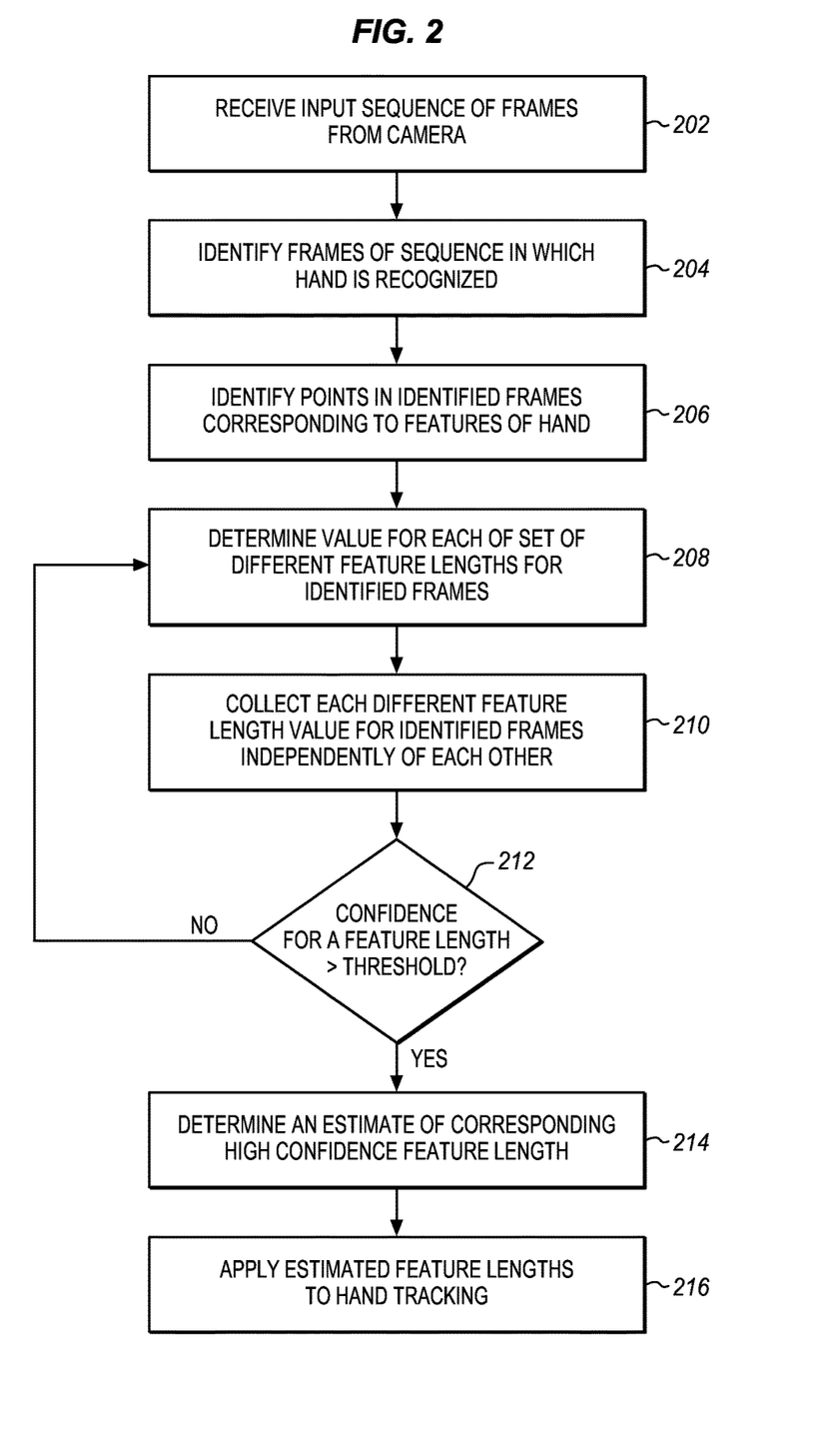
FIG. 2 is a process flow diagram of estimating feature lengths for hands according to an embodiment.

The feature lengths may be determined from the same camera video frames that are used for hand tracking, authorization, gesture recognition and other functions. This removes a variety of different possible error sources. FIG. 2 is a process flow diagram of estimating features lengths for hands in a video sequence of input frames. The process starts at 202 with receiving an input sequence of frames from a camera.

At 204 frames of the sequence in which a hand is recognized are identified. A feature recognition module may be used to analyze frames of the video to identify hands. In some embodiment, frames are only identified when a hand enters the camera's field of view as indicated in the video frames. In this way, the hand dimensions are only estimated when a new hand enters the frame. The estimations are not necessarily repeated for a hand that has remained in the frames. The identified frames may be established by a hand tracking system and used for hand tracking.

At 206 characteristic points in the identified frames are identified that correspond to the selected features of the recognized hand. The points in the frames may be used to determine distances and dimensions. If the frames have a depth map or other depth information, then the distance to the points may also be determined. A variety of different hand features may be selected. In the example of FIG. 1, the features include fingertips 102, 104, 106, 108, 109, including the thumb tip, finger bases 122, 124, 126, 128, 129, including the base of the thumb, and a wrist 130 of the recognized hand. More or fewer features may be used depending on the needs of the hand tracking, authentication, or gesture system.

At 208, the identified frames and characteristic feature points are evaluated. The points are used to determine feature lengths in each frame. A value is determined for each feature length of the set of different feature lengths of the recognized hand using the identified points for each identified frame. The feature lengths of FIG. 1 are the finger lengths 132, 134, 136, 138, 139, including the thumb length, the palm width (from 142), and the palm length 140. More or fewer feature lengths may be used depending on the needs of the hand tracking, authentication, or gesture system. In each frame, each of these lengths is determined. These measurements may be accumulated for the hand during hand tracking.

When a gesture is received so early that the dimensions have not yet been estimated, then a generalized or stored guess of the feature lengths may be used. Alternatively, the video including the gesture may be saved and then interpreted later using the estimated feature lengths after the feature lengths are estimated. While this second approach may cause an initial delay in the responsiveness of the system, it will allow more accurate interpretation of earlier gestures.

Figure 3:
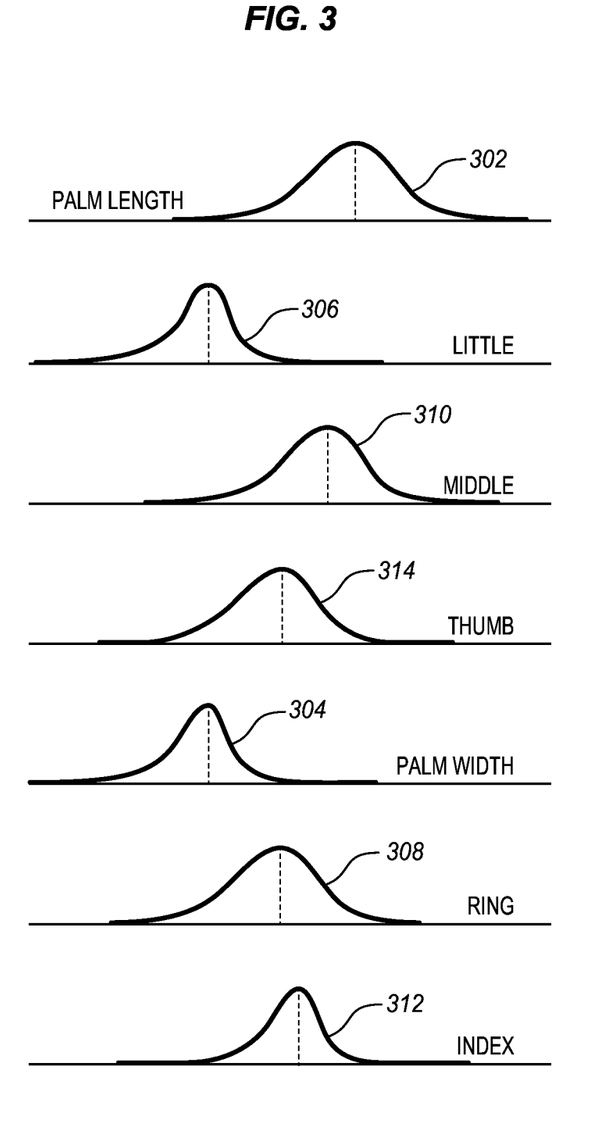
FIG. 3 is a diagram of measured length distributions for each one of several different hand dimensions according to an embodiment.

At 210 each different feature length value for each of the identified frames is collected independently of each other feature length value. Accordingly, there is a collection of palm length values for all of the identified frames. This is shown in FIG. 3 as a collection of points for each palm length plotted as a curve 302 of length on the horizontal axis versus the number of values on the vertical axis. This curve shows a Gaussian distribution which is typical of actual results. However, there may also be unusual values that fall far from the curve.

Similarly, there is a collection of values for the width of the palm 304, for the length of the little finger 306, for the length of the ring finger 308, for the length of the middle finger 310, for the length of the index finger 312, and for the length of the thumb 314. As mentioned there may be more or fewer feature lengths that are used. The feature lengths may continue for succeeding frames until enough samples are collected to provide reliable measurement.

At 212 each of the different collected feature length values are independently analyzed to determine whether an estimate of each different feature length should be generated. As shown in FIG. 3, each feature length curve is a regular Gaussian distribution which would provide a reliable average value for each feature length. Each collection of values may be evaluated independently and additional measurements may be made until the corresponding collection of values is determined to be reliable.

As shown in FIG. 2, valid measurements will approximate a normal distribution. The current distribution may be approximated as shown by the curves in FIG. 3. The outliers may be removed and the distribution approximated again. Typically the outliers will be the tail ends at either end of the distribution. The mean value of the distribution or another measure may be used as the approximated feature length.

As an example a confidence value, such as a standard deviation, may be separately determined for each of the different feature lengths using the respective collection of different feature length values. This confidence value may be assessed using, for example, a threshold. When the confidence meets the threshold, then the corresponding feature length may be estimated using the collected values. When the values show distributions such as those shown in FIG. 3, then an average or median may be used for the estimate.

In some embodiments, a 95% confidence interval is determined for each one of the approximated distributions. The shorter the interval length, the higher the certainty that the mean value of the distribution accurately approximates the true feature length. Once all of the intervals are shorter than some predefined threshold, for example 1-4 mm, the approximation of the user's hand dimensions may be declared reliable.

While the standard deviation is used in the examples presented herein, other techniques may be used to determine whether a large enough number of dimension samples have been obtained. Another example is to use the ratio between the number of samples which fall near the mean and the total number of samples that have been collected. This ratio may be determined after removing any outliers in the collected samples. Other statistical techniques may be used to determine whether the samples are converging toward a consistent and small range of values.

At 212, if the confidence is high enough, then at 214 an estimate of the corresponding feature length is made. If the confidence is not high enough then more feature length values are collected at 208. The analysis of confidence values may be repeated until confidence is high enough for all of the different feature lengths.

At 216 the estimated features lengths may be applied to hand tracking, gesture recognition, or some other purpose.

In an actual sequence of frames, different feature points and different feature lengths may be more or less visible in different frames. As an example, the thumb length may be easily measured in a particular frame, while a portion of the wrist is obscured in the same frame. As a result, the thumb length measurement will be better than the palm length or width measurements. Accordingly, the accuracy of one feature length measurement is not related to the accuracy of another feature length measurement in the same frame. By collecting measurements over multiple frames and treating them independently, a high level of accuracy is possible for each of the feature length estimates.

As mentioned, the confidence value may be statistically determined. A set of samples is used to approximate each feature length's distribution separately and provide an approximation of the length for each feature. Based on the distribution's confidence interval size, a confidence measure reflecting the certainty of the approximated length may also be determined. After the confidence values for a particular feature length has reached a satisfactory level, the corresponding approximated feature length may be used in the hand gesture recognition system.

Once a set of hand measurements has been established these may be reused as the user continues to provide hand gestures. When a hand enters into the field of view of the hand gesture recognition system, the hand may be a previously measured hand or a new hand. The new hand can be compared to previous hands. A quick measurement of the feature lengths of the new hand may be made using one or only a few frames. The likelihood that these measurements were previously used can be determined using computed measurement distributions. In this way, the feature length measurements for the new hand are compared to prior feature length estimates from prior hands. To determine whether the second hand matches a prior hand, the lengths or proportions of lengths may be used. If the likelihood is high, then the new hand has similar proportions to a previous hand. The corresponding prior feature length estimates from the prior hand may be used instead of actually determining estimates for the new hand. If not, then the new hand may be measured from scratch.

Stated another way, if a user's hand leaves the field-of-view and a new hand appears in it, the new hand's measurements may be tested against, for example, a 95% confidence interval to determine if this hand has similar hand proportions to the one seen before. If the proportions differ then it is determined that a new user is using the system and the hand model is refined.

As described herein, a hand measurement may quickly converge on measurements suitable for active hand tracking. Hands with different features lengths, different proportions, and different sizes may all be accommodated. Since each hand is measured independently, different users may be accommodated and even at the same time. At 24 or more frames per second, a video sequence presents many different views of a hand that is presented to the system. Even when the frames are tested for noise, distortions, and occlusions, there are many frames that may be used to determined features lengths. There may be several hundred suitable frames provided every second. In practice, suitable dimensions are obtained within one or two seconds. These dimensions may then be used as long as the hand stays within the camera's field of view. The amount of time required to obtain a suitably accurate set of feature length estimates will depend on the position of the hand in the frame. When a user is intentionally presenting a hand to provide input gestures, then the hand images will be easier to use and the measurement values will converge more quickly toward a suitable result. As mentioned above, the suitability of the measurements may be determined using a statistical analysis, such as a standard deviation, of the collected values.

Reliability Tests

For higher speed and efficiency, the system may reject frames in a video sequence before applying any kind of hand measurement technique. Because feature length samples are not taken from each tracked frame, fewer computations are involved. Frames may be screened to first determine whether there is a high likelihood of obtaining accurate measurements. Due to noise, occlusions and the complexity of the human hand, many of the frames may be unreliable for taking measurements. The reliable frames may be identified and used while data from frames that are expected to provide an unreliable hand measurement may be discarded.

Accurately measuring the different finger lengths and palm sizes of different hands can be very challenging, if not impossible in some scenarios. This is in part due to the complexity of the human hand, in part due to its variability in size and dexterity, in part due to noise and distortions in the input data and in part due to occlusions. Occlusions are caused when some other object in the scene obscures a clear view of the hand or when some part of the hand obscures another part of the hand. This typically happens when the hand is turned sideways and some fingers block a view of the other fingers. In some embodiments frames from the video sequence are selected for measuring the hand. In order to improve the accuracy of the measurements, the frames are each evaluated and only frames for which there is a high probability of fairly accurate measurements are used.

One approach to selecting frames is to select frames in which the hand of interest is facing the camera with all five fingers extended and clearly visible as shown in FIG. 1. However, other techniques may be used for selecting frames. As an example, for a straight front or side view, as shown, it may be hard to measure the two joints between the tip and the base of each finger. These joints are sometimes used when measuring the thumb. There is a great difference in thumb positions and differences between people so that the thumb dimensions are helpful for distinguishing different user's hands as well as in interpreting gestures. Another useful view for these in-between joints is a side view with bent fingers. The system may be configured to select more than one type of view in order to provide better views of some measurement as well as to more quickly converge toward a suitable accurate set of dimensions.

The hand position may be determined with reference to a pre-defined palm plane. In some embodiments, a palm plane may be defined using three of the 3D labeled points on the hand. These points may be the base of the little finger 122, the base of the index finger 128, and the wrist 130. These points are the farthest distanced points of the palm.

Fingertips are farther away from the rest and provide a more accurate plane than the bases of the fingers, but fingertips may be moved away from the plane of the palm when the fingers are bent.

The palm plane may then be evaluated to determine whether it is approximately perpendicular to the depth camera system. The angle of the palm plane may be determined from the depth images and compared to the view of the camera. A frame in which the palm is within a predetermined angle with respect to the camera may be selected over a frame in which the palm is beyond the predetermined angle. Once a usable palm plane is established with the depth images, then the fingertips including the thumb tip may be tested to determine whether they are within the same plane. It is not necessary that all of the fingertips be in the palm plane. A distance measurement for a fingertip that is not within the palm plane may be ignored even while other finger distance measurements are used.

After suitable frames have been selected, then further tests and constraints may be applied. As an example, the proportions of the fingers and the palm may be compared to ensure that they fall, relative to each other, within normal human proportions. If the fingers are unusually long or short compared to the palm, then the selected frame may not be useful. The image of the hand in such a frame may be hampered by noise, distortions, or occlusions. The feature detection system may have even misidentified an object as a hand that it is not a hand.

Improving Measurements

When the input depth images suffer from significant noise, the accuracy of the labeled points and therefore the measurements may be negatively affected. The labeled points may be improved using any of a variety of different operations and functions. In some embodiments, a generated skeleton image and a depth image are compared and then an evaluation function produces a value representing how well the skeleton fits the depth image of the video frame. The skeleton represents the positions of the joints that define the labeled points such as finger bases, fingertips, and the wrist. Alternatively, stored skeletons may be used and selected.

When the skeleton provides a good fit to the depth image, then the depth image may be used to define a skeleton based on the current measurements and the input joint positions from the stored skeleton. This modified skeleton may be used to derive a set of similar skeletons where the finger lengths and palm sizes are augmented by some small amount. Passing the newly derived skeletons through the same evaluation function and choosing one or more of the skeletons with the best results, provides an estimate of the actual distances that relies on anatomy constraints from the stored skeleton in order to adjust the measured distances.

System Architecture

Figure 4:
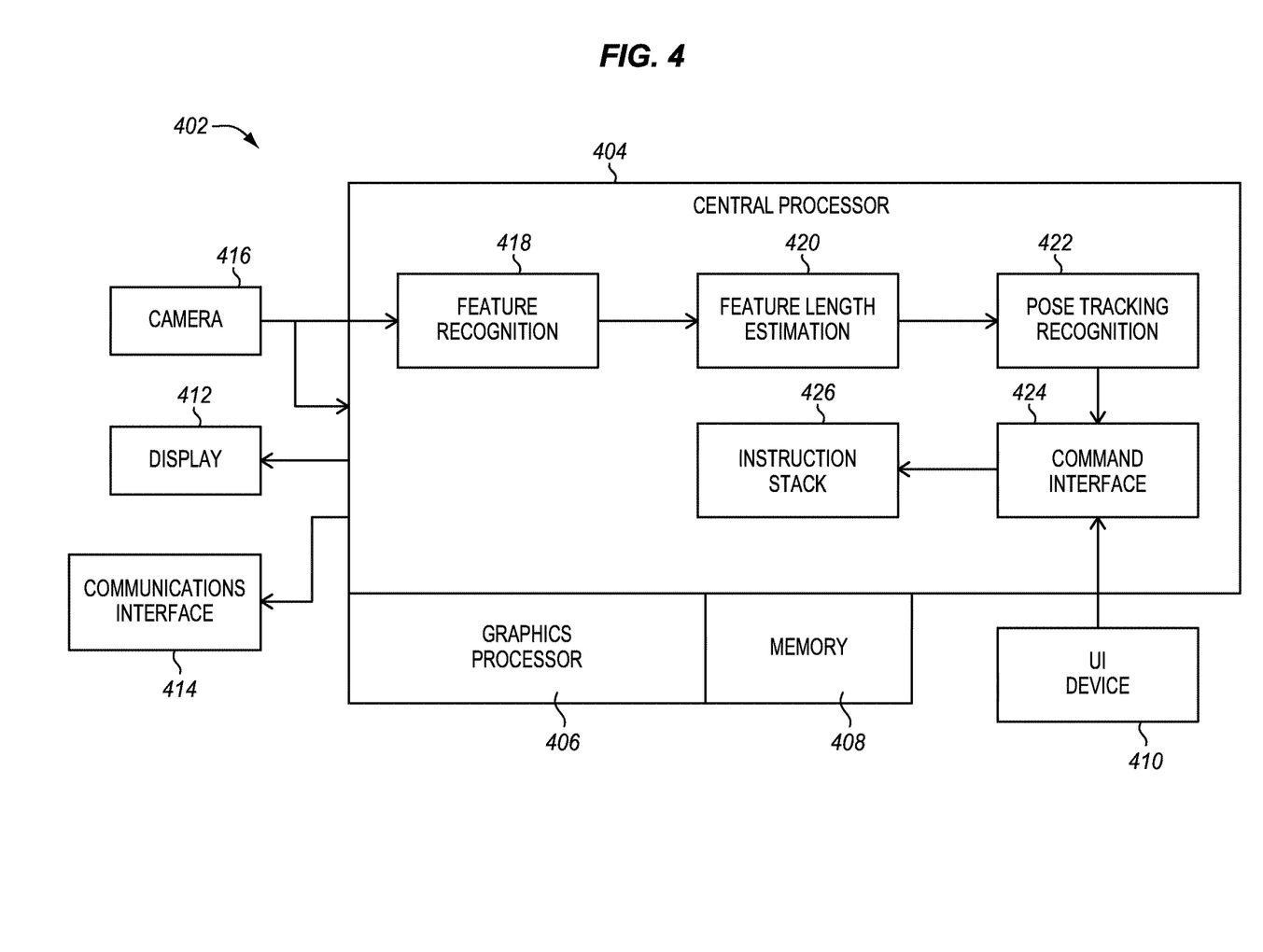
FIG. 4 is a block diagram of a system for estimating feature lengths for hands according to an embodiment.

FIG. 4 is a block diagram of a system for implementing the feature length estimation described herein according to an embodiment. A system 402 may include a central processor 404, a graphics processor 406, and memory 408. These may be in the same or different integrated circuit dies, and the same or different packages. The central processor is coupled to one or more user interface devices 410, such as touch screens, buttons, and cursor control devices. The user interface devices are coupled to a command interface 424 that is coupled to an instruction stack 426. The instruction stack is a part of and supplies instructions for execution by the central processor, graphics processor, and memory. The memory 408 may store image data, hand model parameters, target positions, end-effector positions, finger labels, model selection parameters, convergence parameters, and any other data as discussed herein as well as commands and instructions for execution by the central processor.

The system is also coupled to a camera 416 such as a depth camera with multiple spaced apart image sensors, which supply input video frames to the processor 404 and to a feature recognition system 418. The camera may include internal processing an image signal processor or other components (not shown). The central processor 404 includes the feature recognition system 418 which provides recognized hand feature points to a feature length estimation system 420. The feature length estimation module provides estimated feature lengths for the hand to a hand pose tracking and recognition system. This system recognizes and interprets poses and movements of the recognized hand as authentication, commands, or other information and passes the recognized commands to the command interface 424.

As shown, in some examples, the feature recognition, feature length estimation, and hand tracking may be implemented by central processor 404. In other examples, one or more or portions of these may be implemented by graphics processor 406 or another processing unit.

The graphics processor 406 may be implemented via software or hardware or a combination thereof. Some of the functions described herein may be performed by an execution unit (EU) of the graphics processor.

Figure 5:
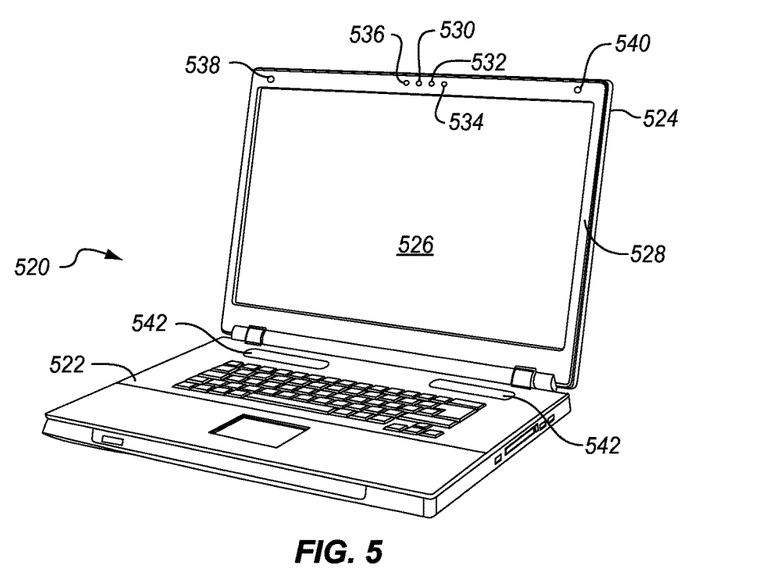
FIG. 5 is an isometric diagram of a computing system for estimating feature lengths for hands according to an embodiment.

FIG. 5 is an isometric diagram of a portable device suitable for use with the depth camera feature length estimation system as described herein. This device is a notebook, convertible, or tablet computer 520 with attached keyboard. The device has a display section 524 with a display 526 and a bezel 528 surrounding the display. The display section is attached to a base 522 with a keyboard and speakers 542. The bezel is used as a location to mount two or three cameras 530, 532 for capturing depth enhanced video images of hands for authentication and gestures. The bezel may also be used to house a flash 534, a white flash or lamp 536 and one or more microphones 538, 540. In this example the microphones are separated apart to provide a spatial character to the received audio. More or fewer microphones may be used depending on the desired cost and audio performance. The ISP, graphics processor, CPU and other components are typically housed in the base 522 but may be housed in the display section, depending on the particular implementation.

This computer may be used as a conferencing or gaming device in which remote audio is played back through the speakers 542 and remote video is presented on the display 526. The computer receives local audio at the microphones 538, 540 and local video at the two composite cameras 530, 532. The white LED 536 may be used to illuminate the local user for the benefit of the remote viewer. The white LED may also be used as a flash for still imagery. The second LED 534 may be used to provide color balanced illumination or there may be an IR imaging system.

Figure 6:
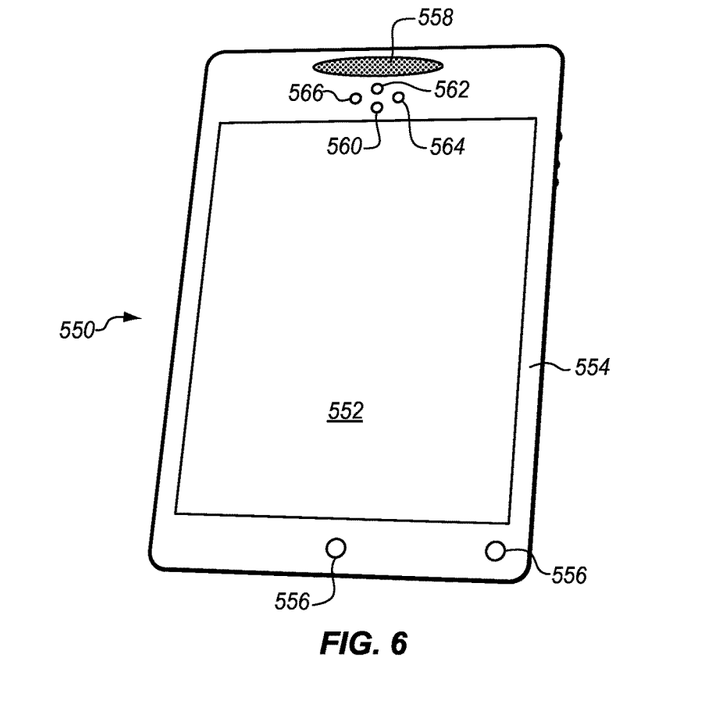
FIG. 6 is an isometric diagram of an alternative computing system for estimating feature lengths for hands according to an embodiment.

FIG. 6 shows a similar device as a portable tablet or smart phone. A similar approach may be used for a desktop monitor or a wall display. The tablet or monitor 550 includes a display 552 and a bezel 554. The bezel is used to house the various audiovisual components of the device. In this example, the bottom part of the bezel below the display houses two microphones 556 and the top of the bezel above the display houses a speaker 558. This is a suitable configuration for a smart phone and may also be adapted for use with other types of devices. The bezel also houses two cameras for depth 564, 566 stacked, and one or more LEDs 560, 562 for illumination. The various processors and other components discussed above may be housed behind the display and bezel or in another connected component.

The particular placement and number of the components shown may be adapted to suit different usage models. More and fewer microphones, speakers, and LEDs may be used to suit different implementations. Additional components, such as proximity sensors, rangefinders, additional cameras, and other components may also be added to the bezel or to other locations, depending on the particular implementation.

The video conferencing or gaming nodes of FIGS. 5 and 6 are provided as examples but different form factors such as a desktop workstation, a wall display, a conference room telephone, an all-in-one or convertible computer, and a set-top box form factor may be used, among others. The image sensors may be located in a separate housing from the display and may be disconnected from the display bezel, depending on the particular implementation. In some implementations, the display may not have a bezel. For such a display, the microphones, cameras, speakers, LEDs and other components may be mounted in other housing that may or may not be attached to the display.

In another embodiment, the cameras and microphones are mounted to a separate housing to provide a remote video device that receives both infrared and visible light images in a compact enclosure. Such a remote video device may be used for surveillance, monitoring, environmental studies and other applications, such as remotely controlling other devices such as television, lights, shades, ovens, thermostats, and other appliances. A communications interface may then transmit the captured infrared and visible light imagery to another location for recording and viewing.

Figure 7:
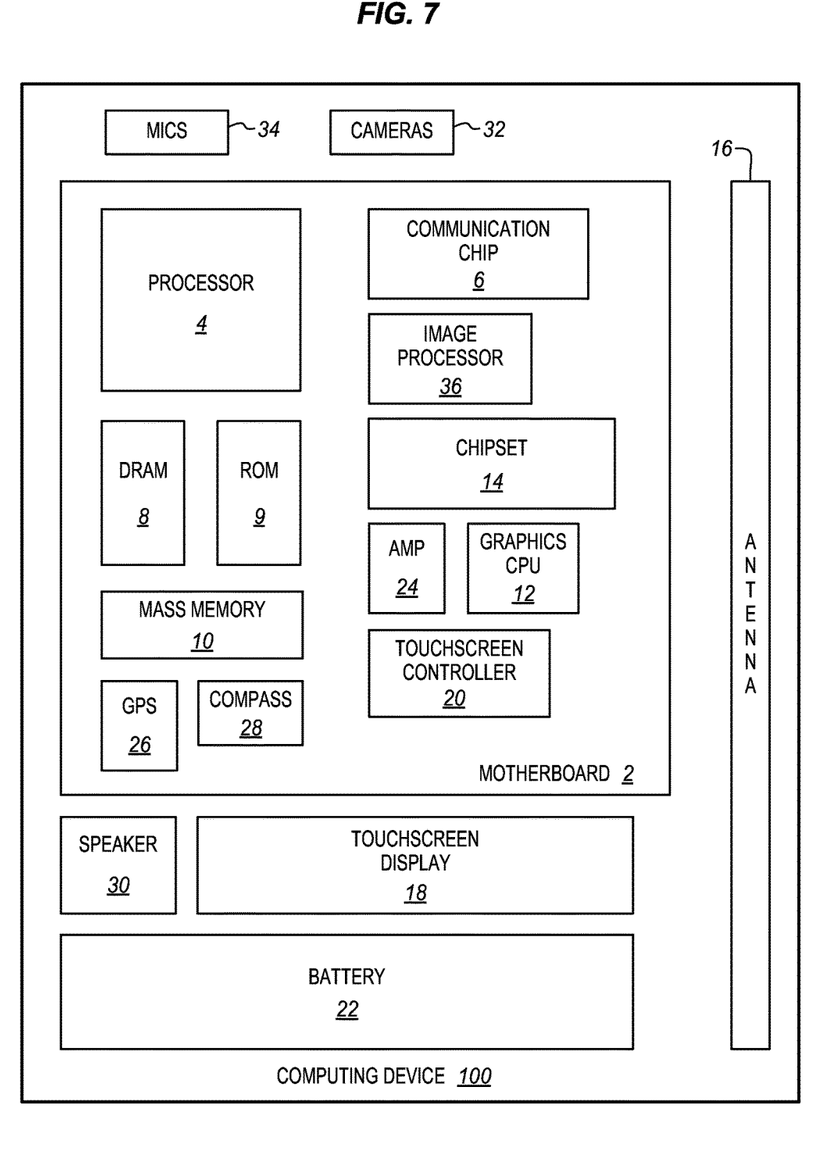
FIG. 7 is a block diagram of a computing device incorporating IR camera enhancements according to an embodiment.

FIG. 7 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 including any depth sensors or proximity sensor are coupled to an optional image processor 36 to perform conversions, analysis, noise reduction, comparisons, depth or distance analysis, image understanding and other processes as described herein. The processor 4 is coupled to the image processor to drive the process with interrupts, set parameters, and control operations of image processor and the cameras. Image processing may instead be performed in the processor 4, the cameras 32 or in any other device.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving an input sequence of frames from a camera, identifying frames of the sequence in which a hand is recognized, identifying points in the identified frames corresponding to features of the recognized hand, determining a value for each of a set of different feature lengths of the recognized hand using the identified points for each identified frame, collecting each different feature length value for the identified frames independently of each other feature length value, analyzing each different feature length value to determine an estimate of each different feature length, and applying the estimated feature lengths to a hand tracking system, the hand tracking system for applying commands to a computer system.

In further embodiments identifying points comprises identifying points corresponding to fingertips, finger bases, and a wrist of the recognized hand.

In further embodiments the different features lengths comprise finger lengths, palm width, and palm length.

In further embodiments statistically analyzing comprises independently determining a confidence value for each different feature length using each respective collection of different feature length values and estimating a feature length when the corresponding confidence value meets a threshold.

In further embodiments the confidence value comprises a standard deviation.

In further embodiments estimating comprises taking an average of the collected feature length values for the corresponding feature length.

In further embodiments taking an average comprises first removing outliers from the corresponding collected feature length values.

In further embodiments identifying frames comprises identifying frames in which the recognized hand has extended fingers.

In further embodiments identifying frames comprises determining a plane of the palm of the recognized hand and identifying frames in which the plane of the palm is within a predetermined angle with respect to the camera.

Further embodiments include determining when a second hand enters a frame of the input sequence, measuring feature lengths for the second hand using the frame in which the second hand enters, comparing feature length measurements to prior feature length estimates to determine whether the second hand matches a prior hand, and if the second hand matches a prior hand then using the corresponding prior feature length estimates from the prior hand.

Some embodiment pertain to a computer-readable medium having instructions thereon that when operated on by the computer causes the computer to perform operations that include receiving an input sequence of frames from a camera, identifying frames of the sequence in which a hand is recognized, identifying points in the identified frames corresponding to features of the recognized hand, determining a value for each of a set of different feature lengths of the recognized hand using the identified points for each identified frame, collecting each different feature length value for the identified frames independently of each other feature length value, analyzing each different feature length value to determine an estimate of each different feature length, and applying the estimated feature lengths to a hand tracking system, the hand tracking system for applying commands to a computer system.

In further embodiments statistically analyzing comprises independently determining a standard deviation for each different feature length using each respective collection of different feature length values and estimating a feature length when the corresponding confidence value meets a threshold.

In further embodiments identifying frames comprises identifying frames in which the recognized hand has extended fingers.

In further embodiments identifying frames comprises determining a plane of the palm of the recognized hand and identifying frames in which the plane of the palm is within a predetermined angle with respect to the camera.

Further embodiments include determining when a second hand enters a frame of the input sequence, measuring feature lengths for the second hand using the frame in which the second hand enters, comparing feature length measurements to prior feature length estimates to determine whether the second hand matches a prior hand, and if the second hand matches a prior hand then using the corresponding prior feature length estimates from the prior hand.

Some embodiments pertain to a computing system that includes a camera to generate an input sequence of frames, a feature recognition system to identify frames of the sequence in which a hand is recognized and to identify points in the identified frames corresponding to features of the recognized hand, a feature length estimation system to determine a value for each of a set of different feature lengths of the recognized hand using the identified points for each identified frame, to collect each different feature length value for the identified frames independently of each other feature length value, to analyze each different feature length value to determine an estimate of each different feature length, and to apply the estimated feature lengths to a hand tracking system, and a command interface to receive commands from the hand tracking system for operation by a processor of the computing system.

In further embodiments identifying points comprises identifying points corresponding to fingertips, finger bases, and a wrist of the recognized hand.

In further embodiments the different features lengths comprise finger lengths, palm width, and palm length.

In further embodiments statistically analyzing comprises independently determining a confidence value for each different feature length using each respective collection of different feature length values and estimating a feature length when the corresponding confidence value meets a threshold.

In further embodiments the confidence value comprises a standard deviation.

What is claimed is:

1. A method for recognizing hand gestures, the method comprising:
    receiving an input sequence of frames from a camera;
    identifying frames of the sequence in which a first hand is recognized;
    (A) identifying points in the identified frames corresponding to features of the recognized first hand;
    (B) determining a value for each of a first set of different feature lengths of the recognized first hand using the identified points for each identified frame, wherein a different value is determined for a same feature length in different ones of the identified frames and different ones of the identified frames being used for different feature lengths when at least one of the identified frames having noise, one or more distortions or one or more occlusions obscuring one or more feature points in the recognized first hand thereby making the at least one identified frame unreliable for use in determining feature lengths of the one or more feature points that are obscured;
    (C) collecting each different feature length value for the identified frames independently of each other feature length value, providing multiple different values for the same feature length from different frames;
    (D) statistically analyzing each different feature length value to determine an estimate of each different feature length independently of determining each other feature length, including independently analyzing each different feature length value to determine whether the estimate of each different feature length of the first hand is to be generated; and
    applying the estimated feature lengths to a hand tracking system after confidence as to the accuracy of each of the estimated feature lengths is determined to reach a satisfactory level, the hand tracking system for applying commands to a computer system;
    determining when a second hand enters a first frame of the input sequence, wherein the second hand enters subsequent to the first hand exiting the input sequence;
    measuring feature lengths for the second hand using one to three frames in which the second hand is present;
    comparing feature length measurements for the second hand to the feature length estimates of the first hand to determine whether the second hand matches the first hand;
    if the second hand matches the first hand, then using the corresponding feature length estimates from the first hand for the second hand, without repeating operations (A), (B), (C), or (D) for the second hand; and
    if the second hand does not match the first hand, then repeating operations (A), (B), (C), and/or (D) for the second hand, to estimate a second set of different feature lengths of the second hand.

2. The method of claim 1, wherein the different feature lengths of the first and second sets comprise finger lengths, palm width, and palm length points corresponding to fingertips, finger bases, and a wrist of the recognized hand.

3. The method of claim 1, wherein the camera is a depth camera and wherein determining a value for the different feature lengths comprises determining a value using a position of the identified points in 3-D space.

4. The method of claim 1, wherein statistically analyzing comprises independently determining a confidence value for each different feature length using each respective collection of different feature length values and estimating a feature length when the corresponding confidence value meets a threshold.

5. The method of claim 4, wherein the confidence value comprises a standard deviation.

6. The method of claim 5, wherein taking an average comprises first removing outliers from the corresponding collected feature length values.

7. The method of claim 4, wherein estimating comprises taking an average of the collected feature length values for the corresponding feature length.

8. The method of claim 1, wherein identifying frames comprises identifying frames in which the recognized hand has extended fingers.

9. The method of claim 1, wherein identifying frames comprises determining a plane of the palm of the recognized hand and identifying frames in which the plane of the palm is within a predetermined angle with respect to the camera.

10. A non-transitory computer-readable medium having instructions thereon that when operated on by a computer causes the computer to perform operations for recognizing hand gestures, the operations comprising:
    receiving an input sequence of frames from a camera;
    identifying frames of the sequence in which a first hand is recognized;
    identifying points in the identified frames corresponding to features of the recognized first hand;
    determining a value for each of a first set of different feature lengths of the recognized first hand using the identified points for each identified frame, wherein a different value is determined for a same feature length in different ones of the identified frames and different ones of the identified frames being used for different feature lengths when at least one of the identified frames having noise, one or more distortions or one or more occlusions obscuring one or more feature points in the recognized first hand thereby making the at least one identified frame unreliable for use in determining feature lengths of the one or more feature points that are obscured;

collecting each different feature length value for the identified frames independently of each other feature length value, providing multiple different values for the same feature length from different frames;

statistically analyzing each different feature length value to determine an estimate of each different feature length independently of determining each other feature length, including independently analyzing each different feature length value to determine whether the estimate of each different feature length should be generated, wherein a hand model comprises the estimated feature lengths of the first hand;

applying the estimated feature lengths to a hand tracking system after confidence as to the accuracy of each of the estimated feature lengths is determined to reach a satisfactory level, the hand tracking system for applying commands to a computer system;

determining when a second hand enters the input sequence;

measuring feature lengths for the second hand using a first frame in which the second hand enters;

comparing feature length measurements for the second hand to the feature length estimates of the first hand to determine whether the second hand matches the first hand;

if the second hand matches the first hand, then using the corresponding prior feature length estimates from the first hand for the second hand, without refining the hand-model of the first hand; and if the second hand does not match the first hand, then refining the hand-model such that the refined hand model corresponds to estimated feature lengths of the second hand.

11. The medium of claim 10, wherein statistically analyzing comprises independently determining a standard deviation for each different feature length using each respective collection of different feature length values and estimating a feature length when a corresponding confidence value meets a threshold.

12. The medium of claim 10, wherein identifying frames comprises identifying frames in which the recognized hand has extended fingers.

13. The medium of claim 10, wherein identifying frames comprises determining a plane of the palm of the recognized hand and identifying frames in which the plane of the palm is within a predetermined angle with respect to the camera.

14. A non-transitory computer-readable medium having instructions thereon that when operated on by a computer causes the computer to perform operations for recognizing hand gestures, the operations comprising:

identify frames of an input sequence of frames in which a first hand is present;

identify points in the identified frames corresponding to features of the first hand;

determine a value for each of a set of different feature lengths of the first hand using the identified points for each identified frame;

collect each different feature length value for the identified frames independently of each other feature length value;

analyze each different feature length value to determine an estimate of each different feature length of the first hand;

apply the estimated feature lengths of the first hand to a hand tracking system;

identify a second hand in one or more frames of the input sequence, the one or more frames occurring in the input sequence after the frames including the first hand;

measure feature lengths of the second hand using the one or more frames;

compare feature length measurements of the second hand to feature length estimates of the first hand; and determine whether the second hand matches the first hand, based on the comparison, and wherein if the second hand matches the first hand, then the feature length estimates of the first hand is used for the second hand, and wherein if the second hand does not match the first hand, then determine an estimate of each different feature lengths of the second hand separately from the estimation of each different feature lengths of the first hand.

15. The computing system of claim 14, wherein identifying points comprises identifying points corresponding to fingertips, finger bases, and a wrist of the recognized hand.

16. The computing system of claim 15, wherein the different features lengths comprise finger lengths, palm width, and palm length.

17. The computing system of claim 14, wherein statistically analyzing comprises independently determining a confidence value for each different feature length using each respective collection of different feature length values and estimating a feature length when the corresponding confidence value meets a threshold.

18. The computing system of claim 17, wherein the confidence value comprises a standard deviation.

19. The A non-transitory computer-readable medium of claim 14, the operations comprising:

for a first feature length of the first hand, collect a plurality of feature length values, each of the plurality of feature length values representing a corresponding estimate of the first feature length in a corresponding frame of the input sequence of frames;

generate a first distribution of the plurality of feature length values;

identify a first feature length value of the plurality of feature length values to be an outlier in the first distribution;

remove the first feature length value from the plurality of feature length values to generate a modified plurality of feature length values, and generating a second distribution of the modified plurality of feature length values; and estimate a dimension of the first feature length of the first hand, based on the second distribution.

* * * * *